(12) United States Patent
Kitaura

(10) Patent No.: US 7,104,536 B2
(45) Date of Patent: Sep. 12, 2006

(54) WORK SUPPORT

(75) Inventor: Ichiro Kitaura, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 127 days.

(21) Appl. No.: 10/492,377

(22) PCT Filed: Oct. 15, 2001

(86) PCT No.: PCT/JP01/09050

§ 371 (c)(1),
(2), (4) Date: May 3, 2004

(87) PCT Pub. No.: WO03/033202

PCT Pub. Date: Apr. 24, 2003

(65) Prior Publication Data

US 2004/0188908 A1    Sep. 30, 2004

(51) Int. Cl.
*B23G 3/08*        (2006.01)
(52) U.S. Cl. .................................................. 269/309
(58) Field of Classification Search ............... 269/22, 269/20, 27, 30, 32, 246, 309, 310; 188/67, 188/129
See application file for complete search history.

(56) References Cited

U.S. PATENT DOCUMENTS

| | | |
|---|---|---|
| 4,825,746 A | 5/1989 | Herner |
| 4,934,672 A | 6/1990 | Craft |
| 5,957,443 A * | 9/1999 | Mascola .................. 269/22 |

FOREIGN PATENT DOCUMENTS

| | | |
|---|---|---|
| JP | 61-62604 | 3/1986 |
| JP | 61-115626 | 6/1986 |
| JP | 4-240034 | 8/1992 |
| JP | 2535972 | 2/1997 |
| JP | 11-46922 | 2/1999 |
| JP | 2000-84112 | 3/2000 |
| JP | 2000-240611 | 9/2000 |
| JP | 2001-271809 | 10/2001 |
| JP | 2001-335288 | 12/2001 |

* cited by examiner

Primary Examiner—Robert C. Watson
(74) Attorney, Agent, or Firm—Jordan and Hamburg LLP

(57) ABSTRACT

A workpiece support has a simplified structure and can operate with improved dependability and reliability. The workpiece support has a rod, a sleeve body externally fitted on the rod and elastically deformable so as to shrink in diameter, a case member supporting the sleeve body, and an external peripheral hydraulic chamber formed on the external periphery of the sleeve body. A hydraulic cylinder is provided for moving the rod in the axial direction and oil passage are provided for connecting the hydraulic operating chamber of the hydraulic cylinder with the external peripheral hydraulic chamber when the piston member of the hydraulic cylinder has moved up to or to the vicinity of the stroke end thereof.

5 Claims, 3 Drawing Sheets

WORK SUPPORT

TECHNICAL FIELD

The present invention relates to a workpiece support that is designed so that a sleeve body externally fitted on a rod is elastically deformed by oil pressure, and the rod is locked, and relates particularly to a workpiece support that is improved so as to increase the reliability and dependability of the operation of the workpiece support.

BACKGROUND OF THE INVENTION

Workpiece supports for supporting workpiece from underneath have been provided for cutting workpiece and the like, and the present applicant has also proposed and submitted patent applications for various workpiece supports (Japanese Patent Application Nos. H11-46922, 2000-84112, and others).

The workpiece support in Japanese Patent Application No. H11-46922 has a case member, a rod, a rod-moving hydraulic cylinder, a sleeve body, a pressure intensifier, an outer peripheral hydraulic chamber, and the like.

The sleeve body is configured so as to be capable of elastic deformation and is supported by the case member, the rod is fitted movably into the sleeve body, and the external peripheral hydraulic chamber is formed on the external periphery of the sleeve body. The pressure intensifier and the rod-driving hydraulic cylinder are built into the case member, and a configuration is adopted whereby oil pressure from an oil pressure supply port formed in the case member is simultaneously supplied to the pressure intensifier and the rod-driving hydraulic cylinder.

In other words, as the rod-driving hydraulic cylinder is actuated by oil pressure supplied via the oil pressure supply port and the rod is moved in the workpiece-supporting direction, the pressure intensifier is actuated and caused to generate high oil pressure in the external peripheral hydraulic chamber, the thin-walled cylinder of the sleeve body is elastically deformed by the high oil pressure so as to shrink in diameter, and the rod is locked.

However, in this workpiece support, because oil pressure is supplied from a shared oil pressure supply port simultaneously to the pressure intensifier and the rod-driving hydraulic cylinder, the rod tends to lock before making contact with the workpiece, thus creating drawbacks of inadequate dependability and reliability of the operation of the workpiece support.

The workpiece support in Japanese Patent Application No. 2000-84112 has a case member, rod, rod-driving hydraulic cylinder, sleeve body, pressure intensifier, and external peripheral hydraulic chamber, as well as a restrictor valve(throttle valve) provided in the oil supply passage leading from the oil pressure supply port to the input oil chamber of the pressure intensifier, and a non-return valve that is capable of discharging the oil pressure of the input oil chamber in the discharge oil passage leading from the input oil chamber to the oil supply port, and that opens from the oil supply port when oil pressure is discharged.

Because a restrictor valve is placed in the oil supply passage leading from the oil pressure supply port to the input oil chamber in this workpiece support, the pressure intensifier can be made to operate subsequently to the rod-driving hydraulic cylinder, and thus the rod can be locked after coming in contact with the workpiece. However, this arrangement has drawbacks because the need for providing a restricting valve and non-return valve increases the number of parts and complicates the structure.

An object of the present invention is to simplify the structure of a workpiece support and increase the dependability and reliability of its operation.

DISCLOSURE OF THE INVENTION

The workpiece support according to the present invention comprises a rod, a sleeve body that is externally fitted on the rod and that is elastically deformable so as to shrink in diameter, a case member for supporting the sleeve body, and an external peripheral hydraulic chamber formed on the external periphery of the sleeve body; further characterized in comprising a rod-driving hydraulic cylinder for moving the rod in the axial direction, and an oil passage for connecting the hydraulic operating chamber of the hydraulic cylinder with the external peripheral hydraulic chamber when the piston member of the hydraulic cylinder has moved up to or to the vicinity of the stroke end thereof.

When workpiece is machined, the workpiece support is placed upright, the workpiece is set on the top of the workpiece support, and oil pressure is supplied from an oil pressure supply source to the hydraulic operating chamber of the rod-driving hydraulic cylinder, whereupon the rod-driving hydraulic cylinder is actuated and the piston member moves upward against the case member, whereby the rod moves upward. In this arrangement, the leading end of the rod comes in contact with the workpiece before the piston member moves up to or to the vicinity of the stroke end thereof.

At this point, the leading end of the rod comes in contact with the workpiece, and the piston member then moves to or near the stroke end thereof, whereupon the hydraulic operating chamber of the hydraulic cylinder is connected with the external peripheral hydraulic chamber via the oil passage. Oil pressure is thereby supplied to the external peripheral hydraulic chamber with the leading end of the rod in contact with the workpiece, the sleeve body is elastically deformed by this oil pressure so as to shrink in diameter, the rod is firmly locked, and the workpiece is reliably supported.

When the rod is retracted after the workpiece has been completely machined, the supply of oil pressure from the oil pressure supply source to the hydraulic operating chamber is stopped. Locking of the rod is then released, and the rod and the piston member can be retracted downward by the elastic urging force of a spring, by a manual operation, or other means, for example.

By means of this workpiece support, particularly because an oil passage is provided for connecting the hydraulic operating chamber of the hydraulic cylinder with the external peripheral hydraulic chamber when the piston member of the rod-driving hydraulic cylinder has moved up to or to the vicinity of the stroke end thereof, the rod is reliably brought into contact with the workpiece, the rod can then be reliably locked, and the dependability and reliability of the operation of the workpiece support can be increased without complicating the structure of the workpiece support.

In this arrangement, a spring member is preferably provided inside the rod for elastically urging the rod to retract. In this case, by stopping the oil pressure supply from the oil pressure supply source to the hydraulic operating chamber, the rod can be retractably moved by the elastic urging force of the spring member, and the piston member can also be retractably moved together with the rod. Also, a second spring member is preferably provided for connecting the rod to the piston member so as to be capable of relative movement in the axial direction by a prescribed stroke, and for elastically urging the rod forward. The piston member and the rod can thereby be integrally raised so that the leading end of the rod first comes in contact firmly with the workpiece and is maintained in that position, the piston member alone can move to or near the stroke end thereof, and the rod can be reliably locked in place and the workpiece reliably supported, as described above. In this case, a configuration is preferably adopted whereby the piston member is elastically urged to retract by the aforementioned spring member used for retraction movement, and the rod is elastically urged to retract with the aid of the piston member. The piston member can thereby be reliably retracted together with the rod.

PREFERRED EMBODIMENT OF THE INVENTION

Figure 1:
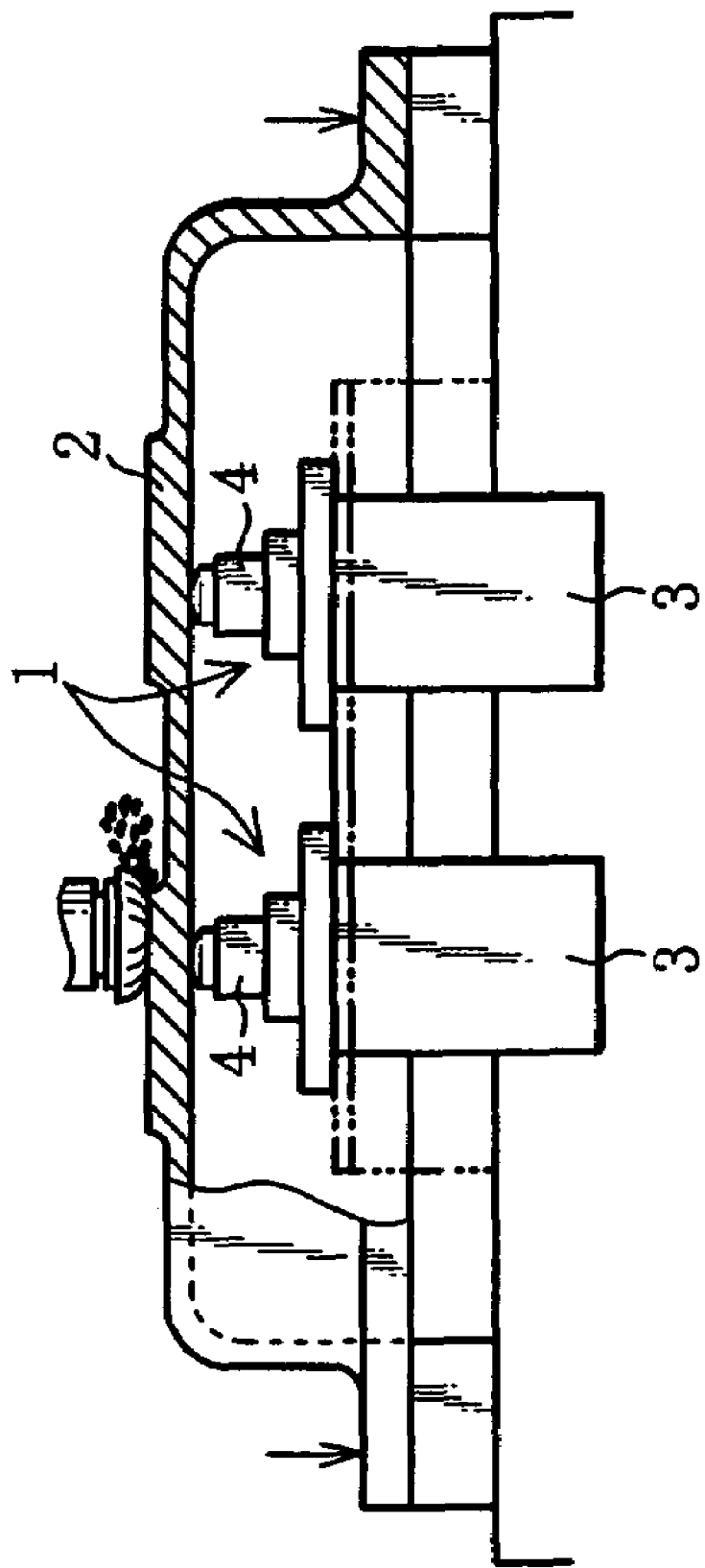
FIG. 1 is a front view of the workpiece support according to an embodiment of the present invention.

An embodiment of the present invention will be described hereinafter with reference to the drawings. As shown in FIG. 1, the workpiece support 1 of the present embodiment is for supporting the workpiece 2 from underneath and preventing the workpiece 2 from vibrating during machining.

Figure 2:
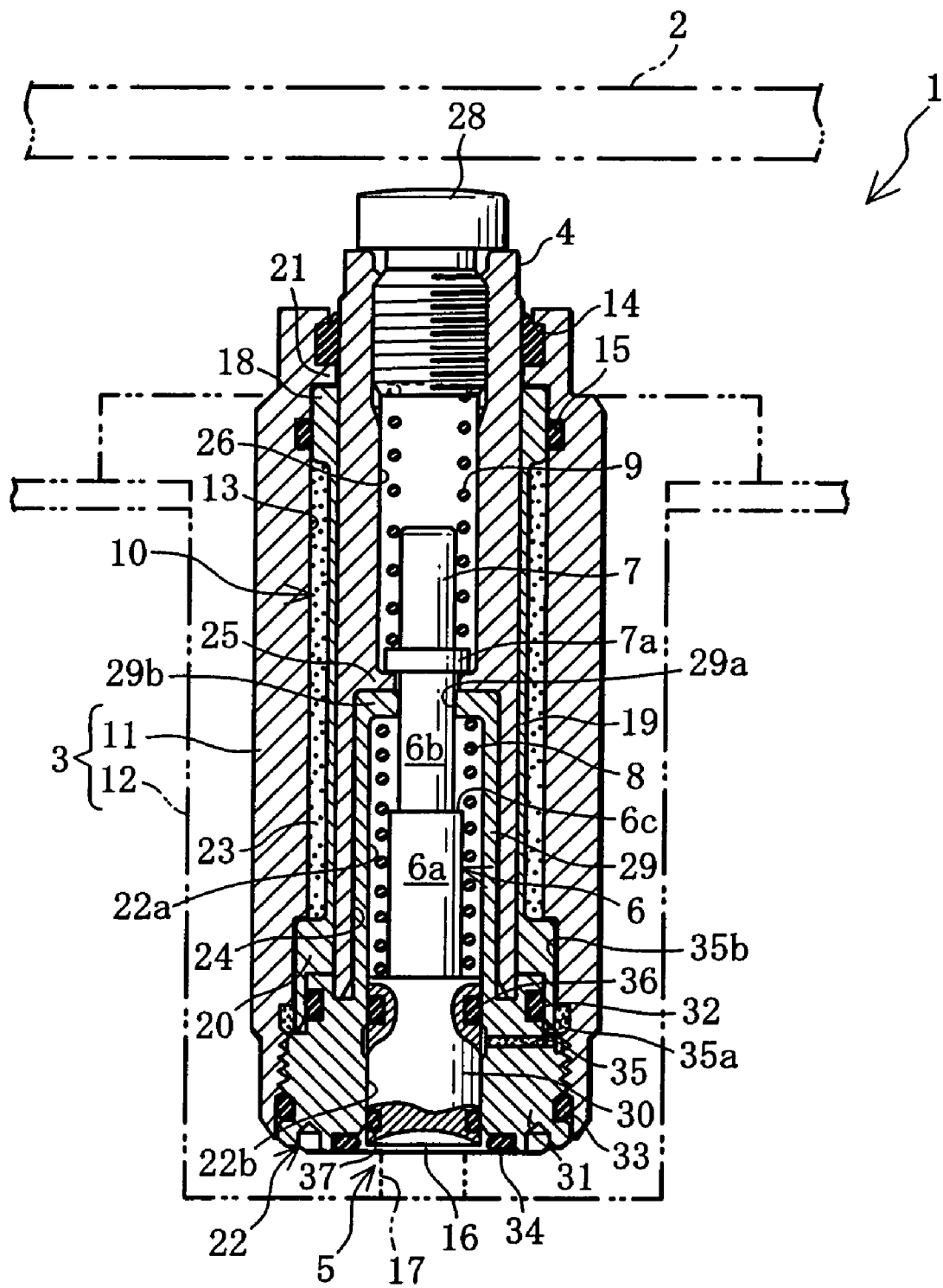
FIG. 2 is a vertically cross-sectional view of the workpiece support in a standby state.
Figure 3:
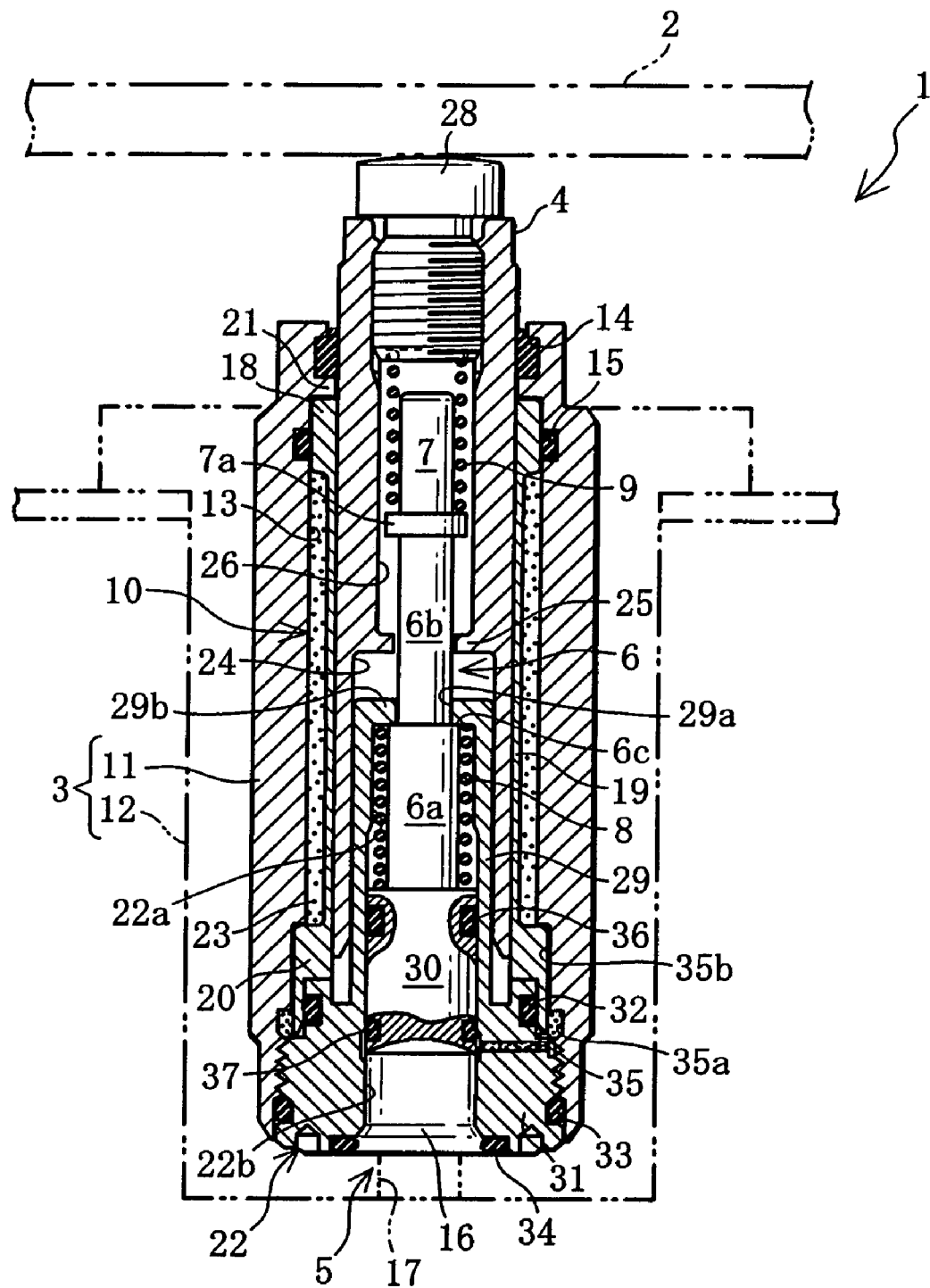
FIG. 3 is a vertically cross-sectional view of the workpiece support in a workpiece-supporting state.

As shown in FIGS. 2 and 3, the workpiece support 1 has a substantially cylindrical case member 3, a rod 4, a rod-driving hydraulic cylinder 5, shaft members 6, 7, spring members 8, 9, a metal sleeve body 10, and the like.

The case member 3 is formed so as to open to the outside from the bottom end upwards, and comprises a case main body 11 open at both ends and a case cover 12 externally fitted on and fixed to the case main body 11. A rod-containing hole 13 is formed in the case main body 11, and seal members 14 and 15 are provided therein. The case cover 12 has a closed-end cylindrical structure and a flange portion formed at the top thereof, and is supported at the flange portion by a prescribed mounting portion. An oil pressure supply port 17 is formed in the bottom wall of the case cover 12, and oil pressure from an oil pressure supply source (not shown) is supplied from the oil pressure supply port 17 to the hydraulic operating chamber 16 of the rod-driving hydraulic cylinder 5.

The sleeve body 10 comprises a securing ring top 18, thin-walled cylinder 19, and securing ring bottom 20 which are formed sequentially in this order from the top to the bottom thereof, and the securing ring top 18, thin-walled cylinder 19, and securing ring bottom 20 are integrally formed. The securing ring top 18 is locked by the top end wall 21 of the case main body 11 from underneath, and the securing ring bottom 20 is sandwiched and held in place between the case main body 11 and the hydraulic cylinder 5. The thin-walled cylinder 19 is configured so as to be able to shrink in diameter by elastic deformation, a ring-shaped external peripheral hydraulic chamber 23 is formed on the external periphery of the thin-walled cylinder 19 between the thin-walled cylinder 19 and the case main body 11, and oil is filled into the external peripheral hydraulic chamber 23.

The rod 4 is slidably inserted into the sleeve body 10, a cylinder hole 24 with a length corresponding to approximately ⅖ of the entire length of the rod 4 from the bottom end is formed inside the rod 4, and a cylindrical hole 26 with a smaller diameter than the cylinder hole 24 is formed in the upper portion than the cylinder hole 24 across a middle wall 25. A guide barrel 29 of the cylinder member 22 is fitted inside the cylinder hole 24, and the rod 4 is configured so as to be able to slide up and down guided by the sleeve body 10 and guide barrel 29.

The rod-driving hydraulic cylinder 5 has a cylinder member 22 and a piston member 30. The cylinder member 22 comprises a cylinder base 31 fitted and screwed into the bottom end of the case main body 11, and the guide barrel 29 that is connected to the cylinder base 31 and extends upwards. A spring-containing hole 22a and cylinder hole 22b are formed in the cylinder member 22, and a shaft passing hole 29a is formed in the top end of the guide barrel 29. Seal members 32, 33, 34 are also provided.

The piston member 30 is fitted into the cylinder hole 22b of the cylinder member 22 so as to be capable of sliding by a prescribed stroke in oiltight fashion. The hydraulic operating chamber 16 is formed in the space enclosed by the cylinder base 31, piston member 30, and case cover 12. The seal members 36, 37 are provided near the top end and near the bottom end, respectively, (near the hydraulic operating chamber) of the external periphery of the piston member 30.

An oil passage 35 is formed in the cylinder base 31, a ring-shaped oil passage 35a is formed in the portion enclosed by the cylinder base 31, securing ring bottom 20, and case main body 11 in the external periphery thereof, and an oil passage 35b connecting the ring-shaped oil passage 35a with the external peripheral hydraulic chamber 23 is formed towards the external periphery of the securing ring bottom 20.

As shown in FIG. 2, the hydraulic operating chamber 16 is not communicated with the external peripheral hydraulic chamber 23 in a state in which the piston member 30 is in the retracted position, but when the piston member 30 has moved up and arrived at or at the vicinity of the stroke end as shown in FIG. 3, the hydraulic operating chamber 16 is then communicated with the external peripheral hydraulic chamber 23 via the oil passages 35, 35a, 35b, and the oil pressure of the hydraulic operating chamber 16 acts on the external peripheral hydraulic chamber 23.

A spring member 8 for elastically urging the rod 4 downward is contained in the spring-containing hole 22a, the bottom end of the spring member 8 is held by the piston member 30, the top end of the spring member 8 is held by the top wall 29b of the cylinder member 22, and the piston member 30 is elastically urged downward with respect to the cylinder member 22 by the spring member 8.

An upright shaft member 6 is integrally formed with the piston member 30 and extends upward from the piston member 30, a flanged shaft member 7 is screwed into the shaft member 6, and the piston member 30 and shaft members 6, 7 move up and down integrally. The shaft member 6 comprises a large-diameter portion 6a and a small-diameter portion 6b, and the aforementioned spring member 8 is externally mounted on the shaft member 6. The small-diameter portion 6b is inserted into the shaft passing hole 29a and through a hole of the middle wall 25, and the shaft member 7 is contained in the cylindrical hole 26 above the middle wall 25 so as to be capable of upward and downward movement.

A spring member 9 is contained in the cylinder hole 26, the bottom end thereof is held by the flange 7a of the shaft member 7, the top end thereof is held by the output portion 28 of the rod 4, and the rod 4 is elastically urged upward with respect to the shaft members 6, 7 and the piston member 30 by the spring member 9.

When the valve of the oil pressure supply source is in the discharge position, the shaft member 7 and piston member 30 receive the urging force of the spring members 9, 8, respectively, the shaft members 7, 6 and piston member 30 are moved downward, and the rod 4 and piston member 30 are moved to the retracted position in a state in which the flange 7a of the shaft member 7 is in contact with the middle wall 25.

When the valve of the oil supply source is in the feeding position and the piston member 30 has reached the stroke end, the shoulder 6c of the shaft member 6 comes in contact with the top wall 29b against the urging force of the spring members 8, 9, the flange 7a separates from the middle wall 25, and the rod 4 is caused to move upward by the spring member 9 and to come in contact with the workpiece 2. Also, separation of the rod 4 from the case member 3 is prevented by means of a configuration whereby the middle wall 25 is stopped by the flange 7a, and the shoulder 6c is stopped by the top wall 29b.

The operation of the workpiece support 1 will next be described.

As described above, the workpiece support 1 is provided with the rod 4, the sleeve body 10 externally fitted on the rod 4 and capable of elastic deformation so as to shrink in diameter, the case member 3 for supporting the sleeve body 10, the external peripheral hydraulic chamber 23 formed in the external periphery of the sleeve body 10, the rod-driving hydraulic cylinder 5 for moving the rod 4 upward, and oil passages 35, 35a, 35b for connecting the hydraulic operating chamber 16 of the hydraulic cylinder 5 with the external peripheral hydraulic chamber 23 when the piston member 30 of the hydraulic cylinder 5 has moved up to or to the vicinity of the stroke end thereof.

When workpiece 2 to be machined is supported from underneath by the workpiece support 1, the workpiece 2 is set on top of the workpiece support 1 and oil pressure is supplied from an oil pressure supply source to the hydraulic operating chamber 16. Whereupon, as shown in FIG. 3, the rod-driving hydraulic cylinder 5 is actuated, the piston member 30 and shaft members 6, 7 move upward against the urging force of the spring members 8, while compressing the spring member 8, and the rod 4 is also integrally moved upward by the spring member 9. The output portion 28 of the rod 4 moving upward then abuts against the workpiece 2 and stops there, whereupon the piston member 30 and shaft members 6, 7 continue to move upward against the urging force of the spring members 8,9 while compressing the spring members 8, 9, as long as the piston member 30 has not moved up to or to the vicinity of the stroke end thereof.

When the piston member 30 has then moved up to or to the vicinity of the stroke end thereof, the hydraulic operating chamber 16 of the hydraulic cylinder 5 is communicated with the external peripheral hydraulic chamber 23 via the oil passage 35, ring-shaped oil passage 35a, and cylindrical oil passage 35b. The oil pressure of the hydraulic operating chamber 16 thereby acts on the external peripheral hydraulic chamber 23, the thin-walled cylinder 19 of the sleeve body 10 is elastically deformed by this oil pressure so as to shrink in diameter, and the rod 4 is securely locked.

When the rod 4 is retracted after the workpiece 2 has been completely machined, the shaft member 7 and piston member 30 receive the urging foece of the spring members 9, 8, respectively, as shown in FIG. 2, once the valve of the oil pressure supply source is switched to the discharge position, the shaft members 7, 6 and the piston member 30 are moved downward, the flange 7a of the shaft member 7 comes in contact with the middle wall 25, the piston member 30 is moved to the retracted position, and the rod 4 is retracted.

The structure of the workpiece support 1 can be simplified and the dependability and reliability of the operation of the workpiece support 1 can be increased when the rod 4 is locked after coming in contact with the workpiece 2, particularly when the piston member 30 of the rod-driving hydraulic cylinder 5 has moved up to or to the vicinity of the stroke end thereof, because the oil passages 35, 35a, 35b are provided for connecting the hydraulic operating chamber 16 of this hydraulic cylinder 5 with the external peripheral hydraulic chamber 23.

Also, a configuration may be adopted in the above-mentioned workpiece support 1 whereby part of the oil passage for connecting the hydraulic operating chamber 16 with the external peripheral hydraulic chamber 23 is formed in the wall of the case member 3. A configuration may also be adopted whereby the case cover 12 is externally fitted on and screwed to the case main body 11.

INDUSTRIAL APPLICABILITY

Various modifications can be added to and implemented in the workpiece support 1 described above, and the present invention can be applied to and implemented in various workpiece supports that are different from the aforementioned workpiece support 1 and are configured such that a sleeve body capable of elastic deformation is elastically deformed by oil pressure to lock a rod, insofar as such modifications are within a range that is in keeping with the essence of the present invention.

The invention claimed is:

1. A workpiece support, comprising:
a rod;
a sleeve body externally fitted on the rod and elastically deformable so as to shrink in diameter;
a case member for supporting the sleeve body;
an external peripheral hydraulic chamber on the external periphery of the sleeve body;
a rod-driving hydraulic cylinder for moving the rod upwardly in an axial direction; and
an oil passage selectively connecting the hydraulic operating chamber of the hydraulic cylinder with the external peripheral hydraulic chamber when a piston member of the hydraulic cylinder has moved up to or to a vicinity of a stroke end thereof.

2. The workpiece support according to claim 1, further comprising a spring member inside the rod for elastically urging the rod to retract.

3. A workpiece support, comprising:
a rod;
a sleeve body externally fitted on the rod and elastically deformable so as to shrink in diameter;
a case member for supporting the sleeve body;
an external peripheral hydraulic chamber on the external periphery of the sleeve body;
a rod-driving hydraulic cylinder including a piston member for moving the rod in an axial direction; and
an oil passage selectively connecting the hydraulic operating chamber of the hydraulic cylinder with the external peripheral hydraulic chamber when said piston member of the hydraulic cylinder has moved at least to a vicinity of the stroke end thereof, communication between said hydraulic operating chamber and said external peripheral chamber being restricted when said hydraulic cylinder is in a retracted position.

4. The workpiece support according to claim 3, further comprising a spring member inside the rod for elastically urging the rod to retract.

5. The workpiece support according to claim 3, wherein communication of said oil passage with said hydraulic operating chamber is physically blocked by said piston when in the retracted position, and established when said piston is moved in a direction towards said stroke end.

* * * * *